(12) United States Patent
Perera

(10) Patent No.: US 8,228,432 B2
(45) Date of Patent: Jul. 24, 2012

(54) PICTURE PROCESSING DEVICE, METHOD THEREFOR, AND PROGRAM

(75) Inventor: Ruwan Perera, Kanagawa (JP)

(73) Assignee: Sony Corporation, Tokyo (JP)

( * ) Notice: Subject to any disclaimer, the term of this patent is extended or adjusted under 35 U.S.C. 154(b) by 1038 days.

(21) Appl. No.: 12/123,936

(22) Filed: May 20, 2008

(65) Prior Publication Data

US 2009/0003727 A1    Jan. 1, 2009

(30) Foreign Application Priority Data

Jun. 26, 2007 (JP) ................................. 2007-167374

(51) Int. Cl.
*H04N 5/45* (2011.01)
*H04N 5/278* (2006.01)

(52) U.S. Cl. ...................... 348/565; 375/240.1; 348/564

(58) Field of Classification Search ............. 375/240.02, 375/240.12, 240.16; 348/56, 239, 500, 564
See application file for complete search history.

(56) References Cited

U.S. PATENT DOCUMENTS

| | | | |
|---|---|---|---|
| 6,046,778 A * | 4/2000 | Nonomura et al. ............ 348/565 |
| 6,795,125 B2 * | 9/2004 | Yui ................................. 348/564 |
| 7,495,709 B2 * | 2/2009 | Abe ................................ 348/586 |
| 2003/0174769 A1 * | 9/2003 | Nagumo et al. .......... 375/240.02 |
| 2007/0121012 A1 | 5/2007 | Hida et al. |
| 2007/0242892 A1 * | 10/2007 | Sugimoto et al. .............. 382/238 |
| 2008/0030617 A1 * | 2/2008 | Sasai et al. ..................... 348/500 |
| 2008/0074441 A1 * | 3/2008 | Chujo et al. .................... 345/634 |
| 2008/0151077 A1 * | 6/2008 | Hatano .......................... 348/239 |
| 2008/0211820 A1 * | 9/2008 | Aoki .............................. 345/522 |
| 2009/0073277 A1 * | 3/2009 | Numata et al. .............. 348/222.1 |

FOREIGN PATENT DOCUMENTS

JP    2004-73416    3/2004
JP    3712696    8/2005

OTHER PUBLICATIONS

Chinese Office Action issued Jan. 10, 2011, in Patent Application No. 101335858 (with Engligh-language translation).

* cited by examiner

*Primary Examiner* — Raj Jain
*Assistant Examiner* — Emmanuel Maglo
(74) *Attorney, Agent, or Firm* — Oblon, Spivak, McClelland, Maier & Neustadt, L.L.P.

(57) ABSTRACT

A picture processing device is capable of performing a process of superposing a sub picture image on a moving picture image which forms a base. The device includes a detection unit for detecting a region in which a movement amount is small, out of a plurality of regions in which the sub picture image may be superposed on the moving picture image which forms a base, and a picture image superposing unit for superposing the sub picture image on the region in which the movement amount is small, the region being detected by the detection unit.

5 Claims, 10 Drawing Sheets

RGNL  RELATIVELY NOT MOVING  RGNR

SUBP

EARTHQUAKE INFORMATION

NIIGATA 5   HIROSHIMA 2
TOKYO 4     YAMAGUCHI 2
SAITAMA 3   OITA 3
CHIBA 3     OKAYAMA 3

RGNL  RELATIVELY NOT MOVING  RGNR

PICTURE PROCESSING DEVICE, METHOD THEREFOR, AND PROGRAM

BACKGROUND OF THE INVENTION

1. Field of the Invention

The present invention relates to a picture processing device in which a picture included in a moving picture image is divided into a plurality of blocks and subject to a compression, a method therefor, and a program.

2. Description of the Related Art

For example, in an HDTV (High Definition Television, which is also referred to as a high resolution television) or a DVD, a large amount of moving picture images are handled, and thus, a compression of the moving picture image is required. For the moving picture image, a standard called MPEG2 (Motion Picture Coding Experts Group 2) is widely used.

With reference to drawings, a description is briefly made on a method of compressing a moving picture image by the MPEG2 system.

FIG. 1 is a diagram for describing an interframe predictive coding, FIG. 2 is a diagram for describing a macro block, and FIG. 3 is a diagram for describing a motion vector.

In the compression of the moving picture image by the MPEG2 system, data of an original picture image is coded by the interframe predictive coding.

As shown in FIG. 1, a moving picture image includes three types of pictures images (frames) 1, i.e., an I frame (also referred to as an I picture (Intra Coded Picture), a P frame (also referred to as a P picture (Predicted Picture)), and a B frame (also referred to as a B picture (Bi-directional Coded Picture)). In a bit stream, the I, P, and B frames are aligned in the order as shown in FIG. 1. In FIG. 1, the I, P and B frames are indicated as I, P, and B, respectively.

The I frame is an intra coded frame which is obtained by coding the original picture image. The P frame is a forward predictive coded frame, in which the I frame is coded as a predictive picture image. The B frame is a bidirectional predictive coded frame, in which the I frame or the P frame is coded as the predictive picture image.

In the MPEG2 system, to increase a coding rate of a whole moving picture image, motion compensation interframe predictive coding is performed. Each of the I, P, and B frame is divided into a macro block (which corresponds to a block of the present invention) of 16×16 pixels, for example, and coding is performed per each macro block.

As shown in FIG. 2, for example, with a format in which a ratio of a brightness signal Y, a color difference signal Cb, and a color difference signal Cr is 4:2:0, data of a brightness signal Y of (16×16) pixels, a color difference signal Cb of (8×8) pixels, and Cr of the same pixels is stored in a single macro block 2.

As shown in FIG. 3, in the MPEG2 system, to show an interframe variation of each macro block 2, a motion vector (which corresponds to a motion amount) 3 indicating a movement of the macro block 2 is estimated, and motion vector information is coded and added to the bit stream. That is, the data of the I, P, and B frames and the motion vector information of the macro block 2 are included in an initial bit stream of the moving picture image.

The moving picture image compressed by the MPEG2 system is decoded by a decoder from the initial bit stream including the data of the I, P, and B frames and the motion vector 3 of each macro block 2.

SUMMARY OF THE INVENTION

In a television including a high definition television, for example, a picture, a caption, etc., for displaying emergency information such as an earthquake bulletin, etc., an electric program guide, information such as an operation menu of a television (the picture, the caption, etc., for displaying these kinds of information are described as a sub picture) is displayed on a picture of a television program.

The sub picture is superposed on a picture which forms a base (hereinafter, described as a base picture). There may occur inconvenience depending on a position where the sub picture and the base picture are superposed. A specific example of this inconvenience is described with reference to a drawing.

FIG. 4 is a diagram for describing superposition of the sub picture and the base picture.

For example, an example indicates a case where a sub picture informing emergency broadcast during on air of baseball game is displayed on the base picture. As shown in FIG. 4, on a display screen of the television, a sub picture 5 for informing the emergency information is superposed on a base picture 4 which shows the baseball game, and thus, the display is shown as in a superposed picture 6.

In the configuration, display of the sub picture 5 is limited to a predetermined region (in the example in FIG. 4, a left region of the superposed picture 6) on the base picture 4. Therefore, as in the baseball game broadcast, when the sub picture 5 is superposed on a region where a motion of the moving picture image is intense (where a pitcher and a batter move, for example), a viewer may lose an important movement of the base picture 4 (in the example of the superposed picture 6 shown in FIG. 4, the movement of the pitcher and the batter is hidden by a display of the sub picture 5).

In the MPEG2 system, a large amount of moving picture images are compressed. Upon decoding the compressed moving picture images, a huge amount of real time processes are required.

In embodiments of the present invention, it is desirable to provide a picture processing device capable of superposing a sub picture on an optimal region of a moving picture image which forms a base, a method therefor, and a program.

A picture processing device of a first aspect of the present invention is one capable of performing a process of superposing a sub picture on a moving picture image which forms a base. The picture processing device includes a detection unit for detecting a region in which a motion is small, out of a plurality of regions in which the sub picture may be superposed on the moving picture image which forms a base, and a picture superposing unit for superposing the sub picture on the region having a small motion, the region being detected by the detection unit.

Preferably, in the moving picture image which forms a base, a plurality of picture images are divided into a plurality of blocks such that each picture image includes a predetermined number of pixels, and subject to a predetermined compression process. The detection unit obtains motion vector information from the block of each picture image included in the moving picture image which forms a base and calculates a region in which a variation of the motion is small between each picture image of the moving picture images.

Preferably, the picture processing device includes a main processor for processing the moving picture image which forms a base and a sub processor for processing the sub picture image. The detection unit calculates a total sum of the movement amounts per units of the blocks of a predetermined number and successively compares the total sum between the adjacent blocks to calculate a region in which the total sum becomes small while sequentially scanning the blocks in a predetermined direction. The image superposing unit superposes the sub picture image obtained from the sub processor on the region of the moving picture image which forms a base, the moving picture image being obtained from the main processor.

Preferably, the picture processing device of the first aspect includes a display unit for displaying the moving picture image outputted by the image superposing unit.

A picture processing method of a second aspect of the present invention is the one capable of performing a process for superposing a sub picture image on a moving picture image which forms a base. The method includes a detecting step of detecting a region in which a movement amount is small, out of a plurality of regions in which the sub picture image may be superposed on the moving picture image which forms a base and a picture superposing step of superposing the sub picture image on the region where the movement amount is small, the region being detected by the detection step.

Preferably, in the moving picture image which forms a base, a plurality of pictures are divided into a plurality of blocks such that a predetermined number of pixels are included in each picture image, and subject to a predetermined compression. The detecting step includes a step of calculating a total sum of the movement amounts per the predetermined numbers of block units and successively comparing the total sum between the adjacent blocks while sequentially scanning the blocks in a predetermined direction, and a step of calculating the region in which the total sum becomes small based on the comparison result.

A program of a third aspect of the present invention is a picture processing capable of performing a process of superposing a sub picture on a moving picture image which forms a base. The picture processing program causes a computer to execute a detecting process for detecting a region in which a movement amount is small, out of a plurality of regions in which the sub picture image may be superposed on the moving picture image which forms a base and a picture image superposing process for superposing the sub picture image on the region in which the movement amount is small, the region being detected by the detection process.

Preferably, in the moving picture image which forms a base, a plurality of picture images are divided into a plurality of blocks such that each picture image includes a predetermined number of pixels, and subject to a predetermined compression. The detecting process causes a computer to execute a process of calculating a total sum of the movement amounts per predetermined numbers of block units and sequentially comparing the total sum between the adjacent blocks while successively scanning the blocks in a predetermined direction, and a process of calculating a region in which the total sum becomes small based on the comparison result.

According to the present invention, in the picture processing device capable of performing a process of superposing the sub picture image on the moving picture image which forms a base, the detection unit detects the region in which the movement amount is small. The picture image superposing unit superposes the sub picture on the region in which the movement amount is small, the region being detected by the detection unit.

According to embodiments of the present invention, a sub picture image may be superposed on an optimal region of a moving picture image which forms a base.

DETAILED DESCRIPTION OF THE EMBODIMENTS

In association with drawings, embodiments of the present invention are described below.
(First Embodiment)
FIG. 5 is a block diagram showing one configuration example of a picture processing device in which a picture processing method according to the embodiment is adopted.

Figure 1:
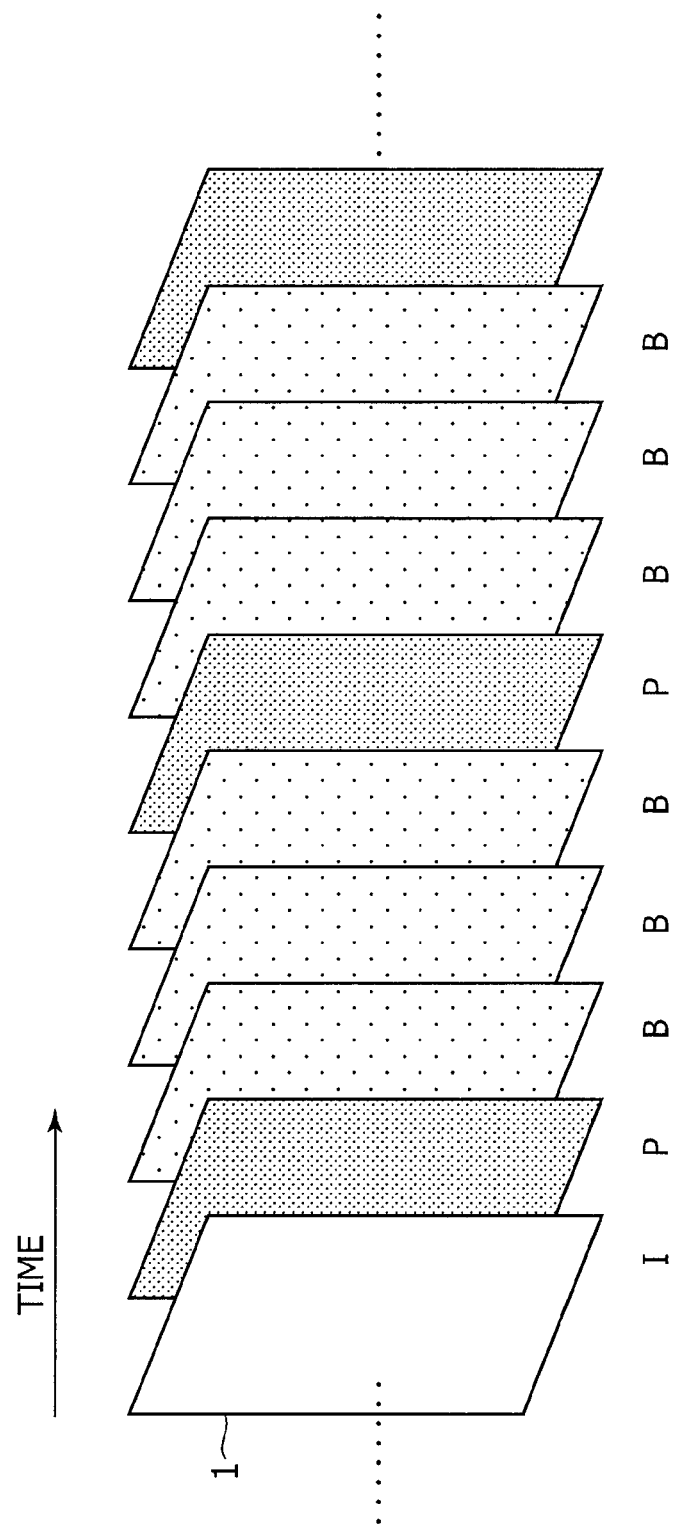
FIG. 1 is a diagram for describing interframe predictive coding.
Figure 2:
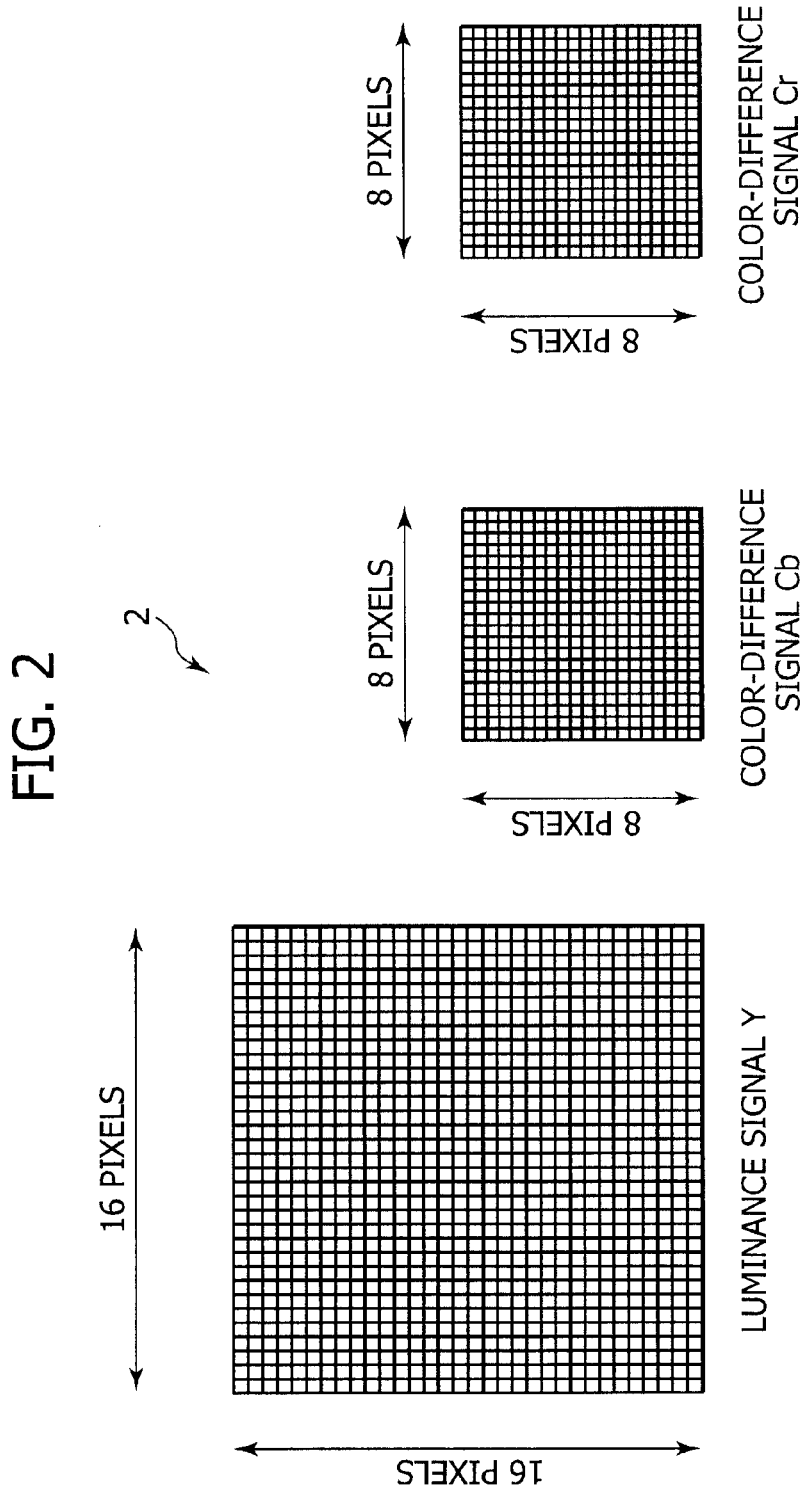
FIG. 2 is a diagram for describing a macro block.
Figure 3:
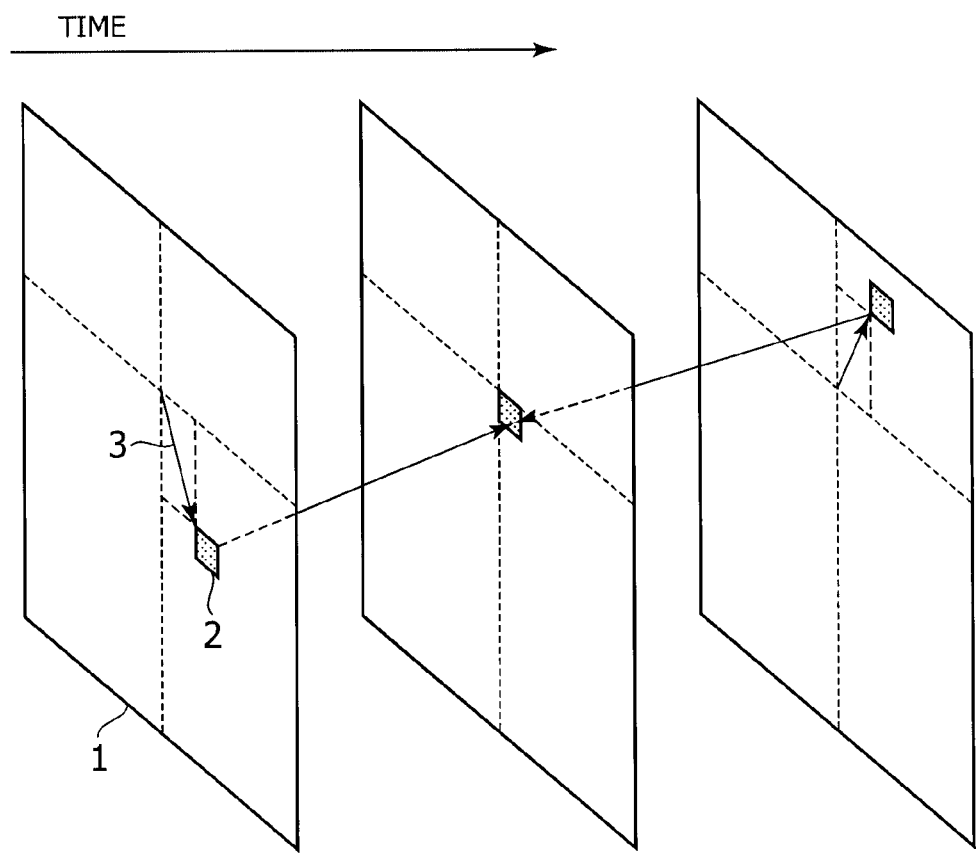
FIG. 3 is a diagram for describing a motion vector.
Figure 4:
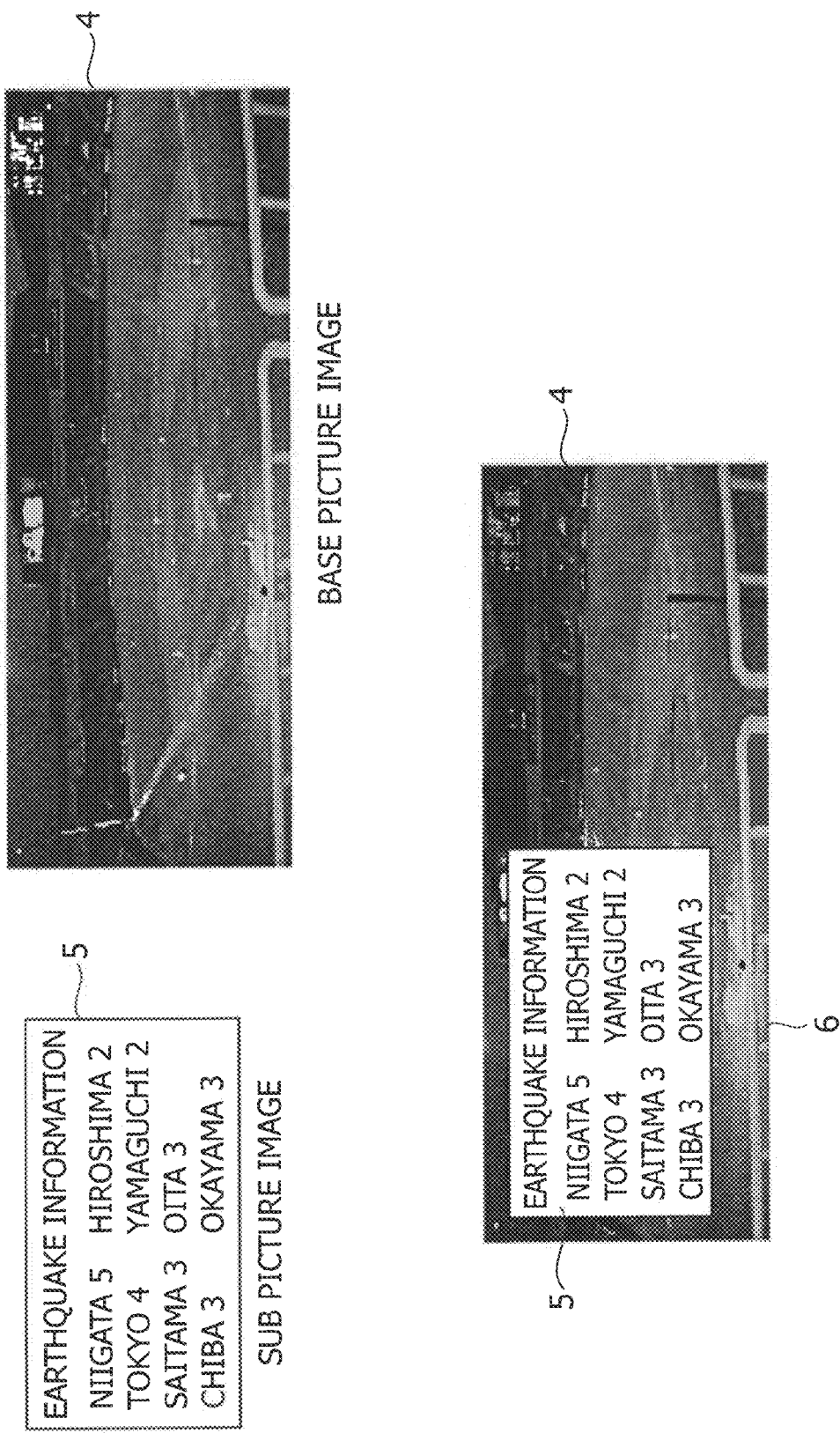
FIG. 4 is a diagram for describing superposition of a sub picture image and a base picture image.
Figure 5:
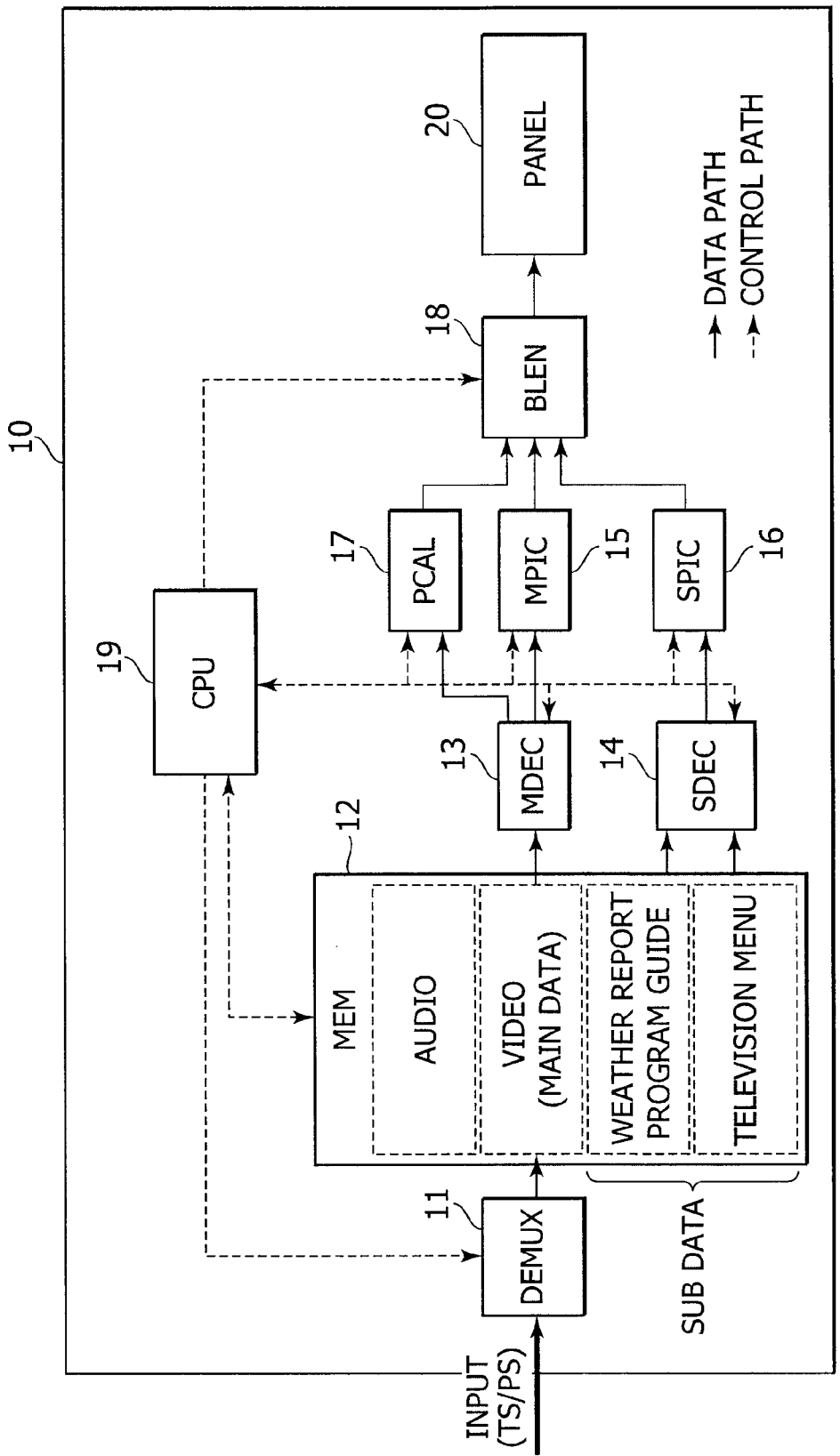
FIG. 5 is a block diagram showing one configuration example of a picture processing device in which a picture processing method according to the embodiment is adopted.

A picture processing device 10 shown in FIG. 5 includes: a classifying unit (DEMUX) 11; a memory (MEM) 12; a main decoder (MDEC) 13; a sub decoder (SDEC) 14; a main processor (MPIC) 15; a sub processor (SPIC) 16; a detection unit (PCAL) 17; a picture image superposing unit (BLEN) 18; a controller (CPU) 19; and a display panel (PANEL) 20.

Subsequently, each component of the picture processing device 10 is described.

An initial bit stream (TS (Transport Stream)) or a program stream (PS) of a moving picture image coded and compressed by the MPEG2 system, for example, are inputted to the classifying unit 11 from outside of the picture processing device 10. Based on control of the controller 19, for example, the classifying unit 11 classifies the inputted initial bit stream or program stream into data of a moving picture image, etc., data of an earthquake bulletin or a weather forecast, a program guide, a television menu, a caption, etc., and audio, etc., each of which forms a base, and outputs these data to the memory 12.

In the following description, in the embodiment, the data of the moving picture image, etc., is indicated as main data, and the data of the earthquake bulletin or the weather forecast, the program guide, the television menu, the caption, etc., are indicated as sub data. In the embodiment, each frame of the moving picture image configured by the main data is indicated as a base picture, and a still picture image configured by the sub data is indicated as a sub picture image. The embodiment is one example, and contents, etc., of the main data and the sub data are not particularly limited. In the embodiment, the sub picture image is the still picture image, but the sub picture maybe a moving picture image, for example.

Various data which are classified by the classifying unit 11, based on the control of the controller 19, for example, is inputted to the memory 12. The memory 12 stores the main data, the sub data, the audio, etc., for example, in a predetermined memory region, and outputs predetermined data to each of the main decoder 13 and the sub decoder 14.

Based on the control of the controller 19, for example, the main decoder 13 reads out the main data from the memory 12, decodes the read out main data, and outputs the decoded main data to the main processor 15 by a frame unit. The main decoder 13 obtains motion vector information of each macro block per each frame, for example, and outputs the obtained information to the detection unit 17.

The sub decoder 14 reads out the sub data from the memory 12, for example, and based on the control of the controller 19, decodes the read out sub data and outputs the data to the sub processor 16.

The main data including the motion vector information, etc., decoded by the main decoder 13, for example in inputted to the main processor 15. Based on the control of the controller 19, for example, the main processor 15 enlarges and reduces the main data per each frame based on a display region of the display panel 20, and outputs data related to the processed moving picture image (a display position, a display size, and the like, for example), etc., to the picture superposing unit 18.

The sub data decoded by the sub decoder 14, for example, is inputted to the sub processor 16. Then, the sub processor 16 enlarges and reduces the decoded sub data according to a setting parameter inputted from the controller 19, and outputs the processed data to the picture superposing unit 18.

The main data including the motion vector information, etc., decoded by the main decoder 13, for example is inputted to the detection unit 17. The detection unit 17 obtains the motion vector information from each block of each base picture, based on the control of the controller 19. The detection unit 17 calculates a region in which a variation of a motion vector value between the base pictures image is small based on the motion vector information and computes a position to be superposed on the base picture image to output the computation result to the picture image superposing unit 18. The detection unit 17 operates the computation of the position per several seconds determined by the controller 19.

Herein, with reference to a specific example, the region in which the variation of the motion vector value between the base pictures image is small is described.

Figure 6:
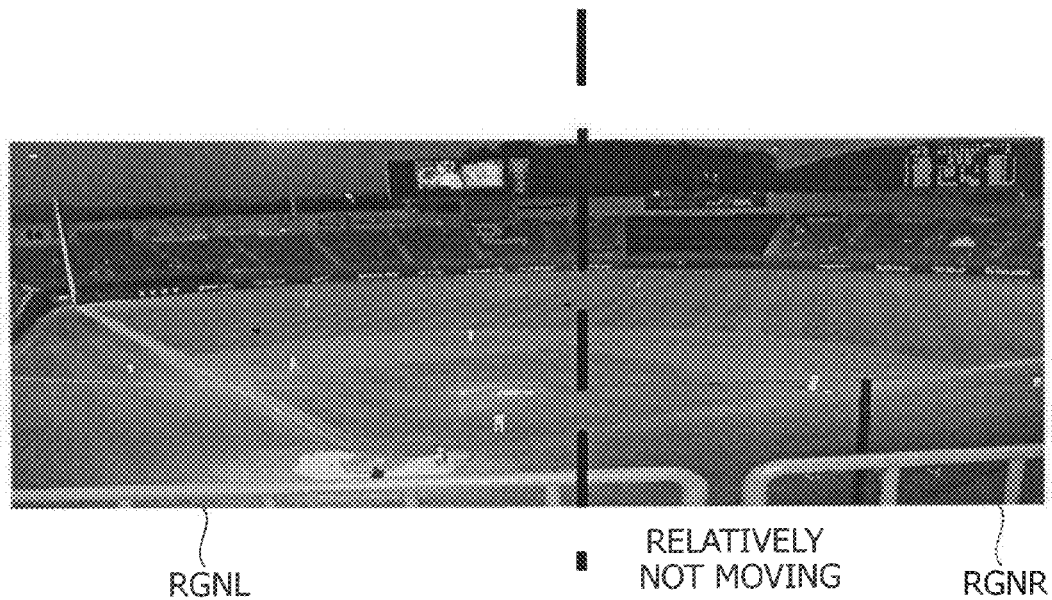
FIG. 6 is a diagram showing one example for describing a variation of a motion vector value calculated by a position calculating unit according to the embodiment.

FIG. 6 is a diagram showing one example for describing the region in which the variation of the motion vector value calculated by a position calculating unit is small according to the embodiment.

Many of moving picture images may be divided into a region in which movement of the picture image is active and a region in which the same is not active. For example, a base picture image of FIG. 6 may be divided into a region RGNL in which movement of the picture image is active and a region RGNR in which the movement of the picture is not so active compared to the region RGNL. One example shown in FIG. 6 indicates a moving picture image compressed by the MPEG2 system. The region RGNR has a motion vector value whose variation is small compared to the motion vector value of the region RGNL.

The moving picture image including the main data from the main processor 15, the still picture image including the sub data from the sub processor 16, and the parameter or the like related to the display position of the sub picture image from the detection unit 17, etc., for example are respectively inputted to the picture image superposing unit 18. Based on each parameter and the control of the controller 19, the picture image superposing unit 18 superposes the sub picture on the region in which the variation of the motion vector value between the base pictures is small to form one frame (picture image), and output the superposed frame to the display panel 20.

One example in which the sub picture is superposed on the base picture by the picture superposing unit 18 is shown.

Figure 7:
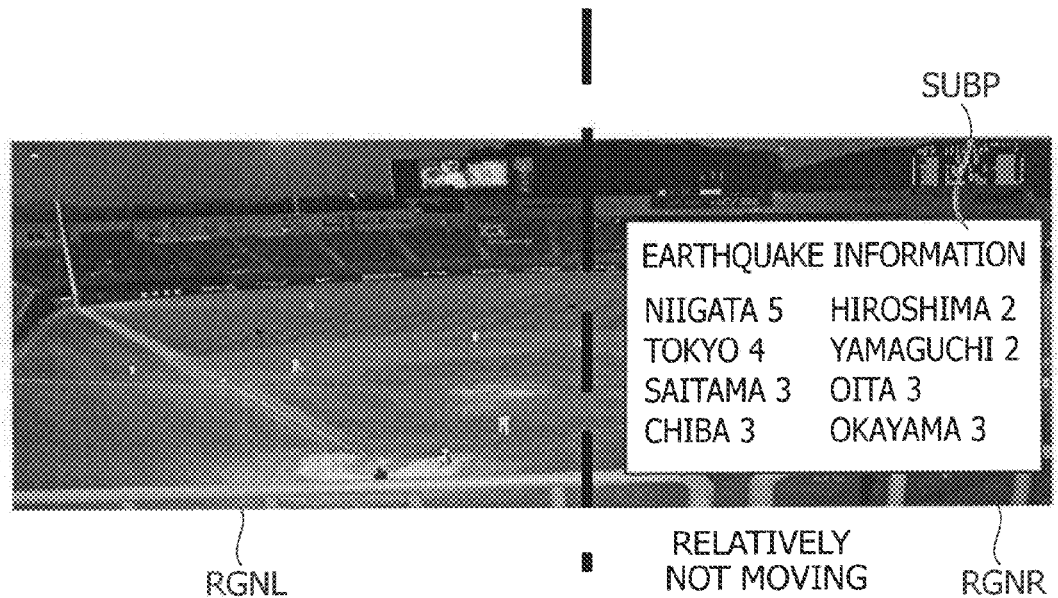
FIG. 7 is a diagram showing one example regarding a sub picture image and a base picture image superposed by a picture image superposing unit according to the embodiment.

FIG. 7 is a diagram showing one example regarding the sub picture superposed on the base picture by the picture superposing unit according to the embodiment.

A base picture shown in FIG. 7 is same with a base picture shown in FIG. 6. As shown in FIG. 7, the picture image superposing unit 18 superposes a sub picture SUBP on the region RGNR in which the variation of the motion vector value between the base pictures is small.

The controller 19 sets an initial parameter, etc., of each component, a display position of the base picture image, etc., and controls between the memory 12, the main decoder 13, the sub decoder 14, the main processor 15, the sub processor 16, and the detection unit 17, respectively, for example. The controller 19 controls the classifying unit 11 and the picture image superposing unit 18, for example.

The display panel 20 is a CRT (Cathode Ray Tube) display, and a liquid crystal display, for example. Frames in which the sub picture is superposed on the base picture by the picture superposing unit 18 are sequentially inputted to the display panel 20 for display. The display panel 20 is not limited to the CRT display and the liquid crystal display.

Next, the display region of the display panel 20 is described.

Figure 8:
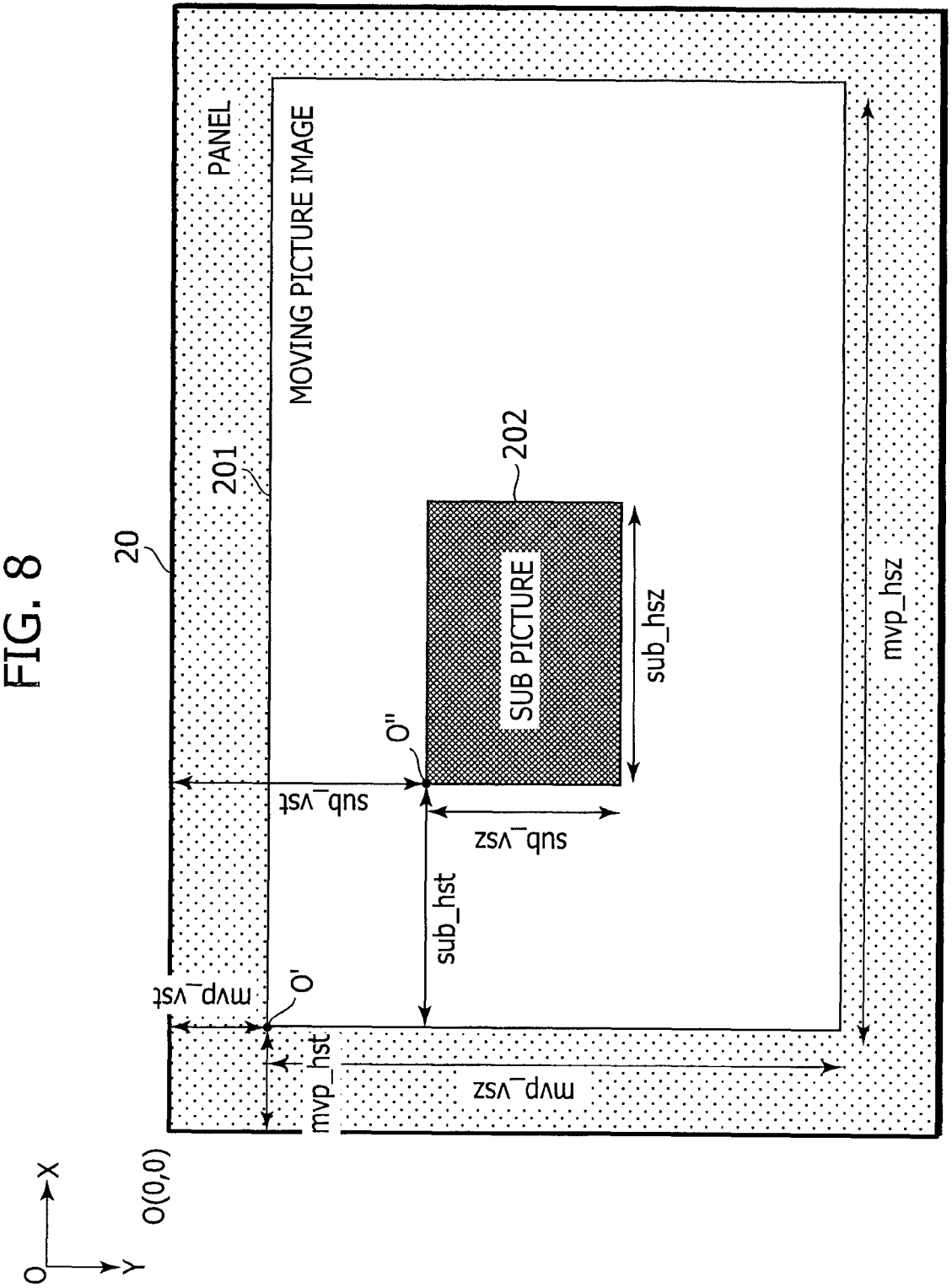
FIG. 8 is a diagram showing one example of a display region on a display panel according to the embodiment.

FIG. 8 is a diagram showing an example of the display region on the display panel according to the embodiment.

As shown in FIG. 8, the display panel 20 includes a base picture image region 201 for displaying the base picture and a sub picture region 202 for displaying the sub picture.

As shown in FIG. 8, in the embodiment, an upper left corner of the display panel 20 is set to be an origin point O(O(0, 0)), for example. In the following description of the embodiment, a unit used for the display region is set to be a pixel, and indication of unit is omitted.

In the base picture region 201, an origin point O' is placed at a position (O'(mvp_hst, mvp_vst)), i.e., mvp_hst in an X-axis direction from the origin point 0 of the display panel 20 and mvp_vst in a Y-axis direction, for example. In the base picture region 201, a region thereof is set to be mvp_hsz in the X-axis direction from the origin point O' and mvp_vsz in the Y-axis direction.

In the sub picture image region 202, an origin point O" is placed at a position of (mvp_hst+sub_hst) in the X-axis direction from the origin point O and sub_vst in the Y-axis direction, for example. In the sub picture image region 202, a region thereof is set to be sub_hsz in the X-axis direction from the origin point O" and sub_vsz in the Y-axis direction.

In the embodiment, the base picture image of the base picture image region 201 is divided into the macro blocks. Next, a description is given on the macro block.

Figure 9:
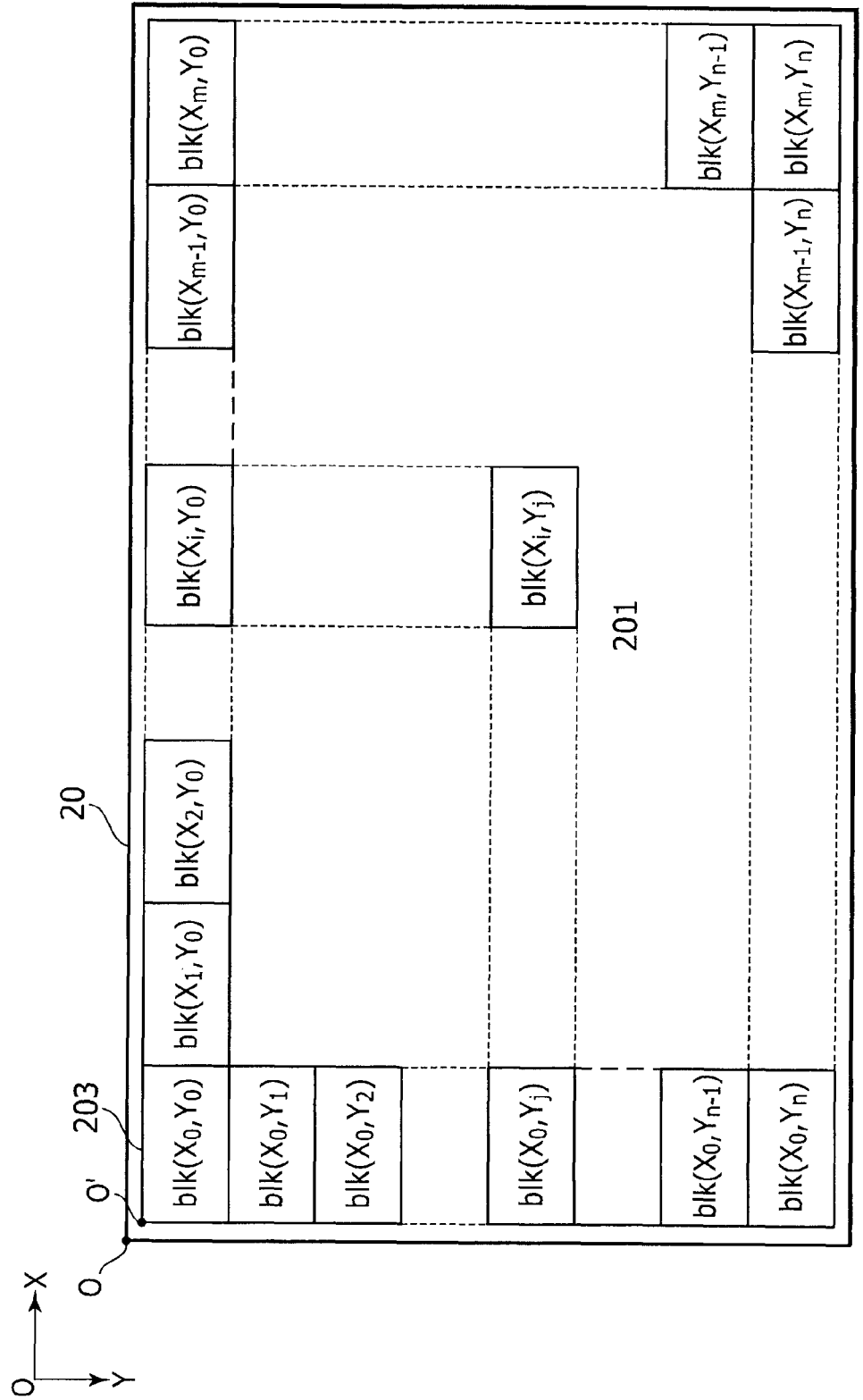
FIG. 9 is a diagram showing one configuration example of a macro block of a moving picture image according to the embodiment.

FIG. 9 is a diagram showing one configuration example of the macro block of the moving picture image according to the embodiment.

As shown in FIG. 9, in the embodiment, on the display panel 20, a base picture images of the base picture image region 201 are divided into $(m+1) \times (n+1)$ macro blocks (blk) 203 in a matrix form, for example. A macroblock 203 is simply indicated as a blk (Xi, Yj).

Noted that m and n denote numbers of macro blocks which correspond to a horizontal width (the X-axis direction) of the base picture and to a vertical width (Y-axis direction) of the base picture, respectively, and is a positive integer (0, 1, ... ). Further, i and j are positive integers (0, 1, ... ).

Subsequently, with reference to FIG. 5, and FIG. 8 to FIG. 10, a description is given of an operation of the picture processing device in which the picture processing method according to the embodiment is adopted.

Figure 10:
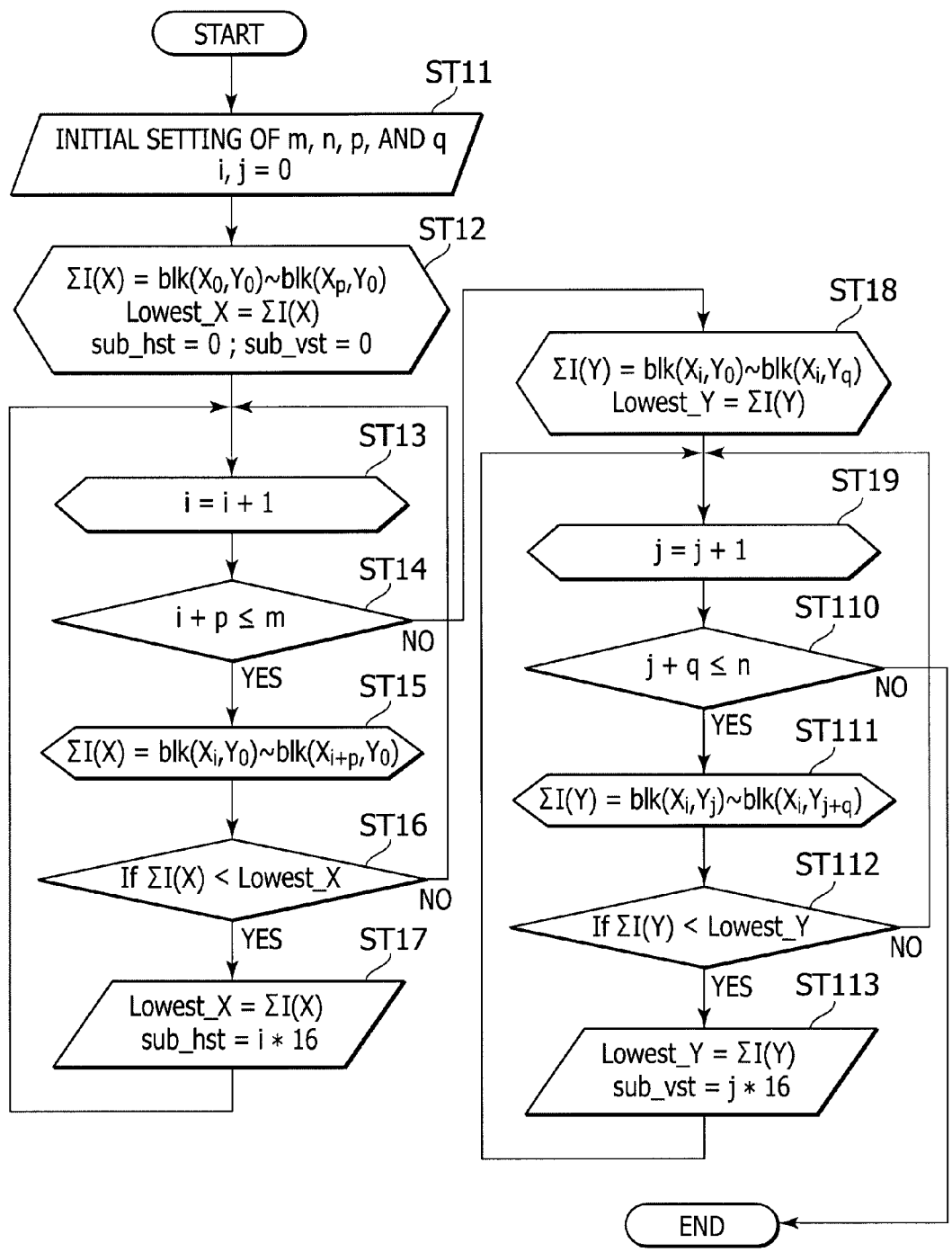
FIG. 10 is a flowchart of a picture processing device in which a picture processing method according to the embodiment is adopted.

FIG. 10 is a flowchart of the picture processing device in which the picture processing method according to the embodiment is adopted.

In the following description, a description is mainly given on an operation of the detection unit 17 shown in FIG. 5.

For example, the classifying unit 11 classifies moving picture images coded and compressed by the MPEG2 system, into at least the main data and the sub data to be stored in the memory 12. The main decoder 13 and the sub decoder 14 read out the respectively corresponding data from the memory 12, decodes the data, and output the decoded data to respectively corresponding components. Data of a predetermined moving picture image, etc are respectively inputted to the main processor 15, the sub processor 16, and the detection unit 17, in advance.

(Step ST11)

At step ST11, initial settings of each parameter regarding the display regions of the base picture image and the sub picture image are performed.

Specifically, in the embodiment, the display region of the base picture image region 201 is set to mvp_hsz=m×16, mvp_vsz=n×16 (see FIG. 8), for example. In the embodiment, the display region of the sub picture image region 202 (see FIG. 8) is set to be sub_hsz=p×16, sub_vsz=q×16, for example. It is noted that p and q denote numbers of macro blocks which correspond to a horizontal width (the X-axis direction) of the sub picture image and to a vertical width (Y-axis direction) of the sub picture image, respectively, and are positive integers (0, 1, . . . )

(Step ST12)

At step ST12, while scanning the base picture image in the X-axis direction, the detection unit 17 detects a total sum of motion vector values between the adjacent macro blocks.

Specifically, as shown in FIG. 9, for example, a blk (X0, Y0) positioned at the origin point O' of the base picture image region 201 is set to be a starting point of scanning (i=0). The detection unit 17 selects p of macro blocks 203 (blk(X0, Y0) to blk (X(O+p), Y0), for example) which correspond to the horizontal width of the sub picture region 202 starting from this blk (X0, Y0) in the X-axis direction of the same row, and calculates a total sum $\Sigma I(X)$ of the motion vector values.

The detection unit 17 sets the total sum $\Sigma I(X)$ to be a minimum value Lowest_X (Lowest_X=$\Sigma I(X)$). At this time, the origin point O" of the sub picture image region 202 is positioned at sub_hst=0, sub_vst=0, that is, at O" (0, 0).

(Step ST13)

At step ST13, to simplify the description, it is assumed that the starting point of scanning is positioned at i (at blk (Xi, Yj), for example).

The detection unit 17 changes the starting point of scanning in the same row to a position shifted in the X-axis direction by one adjacent macro block 203 (i=i+1). Therefore, at this time, the starting point of scanning becomes blk (X(i+1), Y0).

(Step ST14)

Step ST14 is related to a process of a boundary (X-axis direction) of the base picture image region 201.

Specifically, at the starting point of scanning by the detection unit 17, when one end (a p-th selected macro block 203, for example) of the sub picture region 202 reaches a last macro block 203 (blk (Xm, Y0) shown in FIG. 9, for example) in the X-axis direction ((i+p)>m), the detection unit 17 performs a process of step ST18.

A starting point in the X-axis direction of the sub picture region 202 is determined by step ST14.

At the starting point of scanning by the detection unit 17, when the one end of the sub picture image region 202 does not reach the last macro block in the X-axis direction ((i+p)<m), the detection unit 17 performs a process of step ST15.

(Step ST15)

At the step ST15, the detection unit 17 selects p of macro blocks 203 (blk (Xi, Y0) to blk (X(i+p), Y0), for example) adjacent in the X-axis direction starting from the blk (Xi, Y0) in the same row, for example, and calculates a total sum $\Sigma I(X)$ of the motion vector values.

(Step ST16)

At step ST16, the detection unit 17 compares the total sum $\Sigma I(X)$ and the minimum value Lowest_X set at the step ST12.

Specifically, when the total sum $\Sigma I(X)$ is larger than the minimum value Lowest_X set at the step ST12 ($\Sigma I(X) \Delta$Lowest_X), the detection unit 17 performs the process of the step ST13.

When the total sum $\Sigma I(X)$ is smaller than the minimum value Lowest_X set at the step ST12 ($\Sigma I(X)$<Lowest_X), the detection unit 17 performs a process of step ST17.

(Step ST17)

At the step ST17, the detection unit 17 updates the total sum $\Sigma I(X)$ calculated at the step ST15 to a most new minimum value Lowest_X (Lowest_X=$\Sigma I(X)$), and sets the starting point of scanning in the X-axis direction of the macro block 203 to sub_hst=i×16. Then, the detection unit 17 performs the process of the step ST13.

(Step ST18)

At the step ST18, while scanning the base picture image in the Y-axis direction, the detection unit 17 detects a total sum of motion vector values among the adjacent macro blocks.

Specifically, as shown in FIG. 9, for example, the detection unit 17 sets the macro block 203 at the starting point of scanning to blk (Xi, Y0), selects q of macro blocks 203 (blk (Xi, Y0) to blk (Xi, Y(0+q)), for example) adjacent in the Y-axis direction of the same column from the blk (Xi, Y0), and calculates a total sum $\Sigma I(Y)$ of the motion vector values.

Then, the detection unit 17 sets the total sum $\Sigma I(Y)$ to be a minimum value Lowest_Y (Lowest_Y=$\Sigma I(Y)$).

(Step ST19)

At step ST19, the detection unit 17 changes the starting point of scanning in the same column to a position shifted by one macro block 203 adjacent in the Y-axis direction (j=j+1). Therefore, at this time, the starting point of scanning is set to be blk (Xi, Y(j+1)).

(Step ST110)

Step ST110 relates to a process of a boundary (Y-axis direction) of the base picture region 201.

Specifically, at the starting point of scanning by the detection unit 17, when one end (a q-th selected macro block 203, for example) of the sub picture image region 202 reaches a last macroblock 203 (blk (Xi, Yn), for example) in the y-axis direction ((j+q) >n), the detection unit 17 ends the process (END).

By the step ST114, the starting point of the sub picture image region 202 in the Y-axis direction is determined.

When the starting point of scanning by the detection unit 17 does not reach the last macro block in the Y-axis direction ((j +q)≦n), the detection unit 17 performs a process of step ST111.

(Step ST111)

At step ST111, the detection unit 17 selects, from blk (Xi, Yj), q of macro blocks 203 (blk (Xi, Yj) to blk (Xi, Y(j+q)), for example) adjacent in the Y-axis direction in the same column, and calculates a total sum ΣI(Y) of the motion vector values, for example.

(Step ST112)

At step ST112, the detection unit 17 compares the total sum ΣI(Y) and the minimum value Lowest_Y set at the step ST18.

Specifically, when the total sum ΣI(Y) is larger than the minimum value Lowest_Y set at the step ST18 (ΣI(Y)≧Lowest_Y), the detection unit 17 performs the process of the step ST19.

When the total sum ΣI(Y) is smaller than the minimum value Lowest_Y set at the step ST8 (ΣI(Y)<Lowest_Y), the detection unit 17 performs a process of the step ST13.

(Step ST113)

At step ST113, the detection unit 17 updates the total sum ΣI(Y) calculated at the step ST111 to a newest minimum value Lowest_Y (Lowest_Y=ΣI(Y)), and sets the starting point of scanning in the Y-axis direction of the macro block 203 to sub_vst=j×16. Then, the detection unit 17 performs the process of the step ST19.

When the display region of the sub picture image region 202 is not determined by the processes from the step ST11 to the step ST113, the detection unit 17 sets the origin point O' of the base picture image region 201 to the starting point of the sub picture image region 202.

As described above, the detection unit 17 sets the origin point O' (mvp_hst, mvp_vst) of the base picture image region 201 as the starting point of scanning, calculates the motion vector values of p of macro blocks while successively scanning in the X-axis direction, and sets a position at which a total sum becomes minimum as the starting point of the sub picture image region 202 in the X-axis direction. Subsequently, the detection unit 17 calculates the motion vector values of q of macro blocks while successively scanning in the Y-axis direction, and sets a position at which a total sum becomes minimum as the starting point of the sub picture image region 202 in the Y-axis direction. The detection unit 17 calculates a region of the adjacent macro block 203, and sets this region as the sub picture image region 202.

Subsequently, based on the calculation result of the detection unit 17, the picture image superposing unit 18 superposes the sub picture inputted from the sub processor 16 on the sub picture region 202 of the base picture inputted from the main processor 15.

The display panel 20 displays the moving picture image inputted from the picture superposing unit 18.

As described above, in the embodiment, there is an advantage in that since the sub picture image is displayed in the region where motion of the moving picture image is not hard, an influence posed on the base picture which is on air due to the sub picture image is reduced.

In the embodiment, the sub picture image is not required to be displayed at a previously determined position of the base picture image, therefore the display region of the display panel may be effectively utilized. For example, in the embodiment, when displaying a commercial message as a sub picture image during on air of a television program, the sub picture image may be displayed without changing the display region of the television program.

In the embodiment, a bit stream of the moving picture image compressed by the MPEG2 system, for example, is used, and the motion vector information included in the bit stream is utilized to acquire the display region of the optimal sub picture image. Therefore, the moving picture image processing system may be easily mounted in a high definition television, a DVD, etc.

(Second Embodiment)

Subsequently, a second embodiment of the present invention is described.

Figure 11:
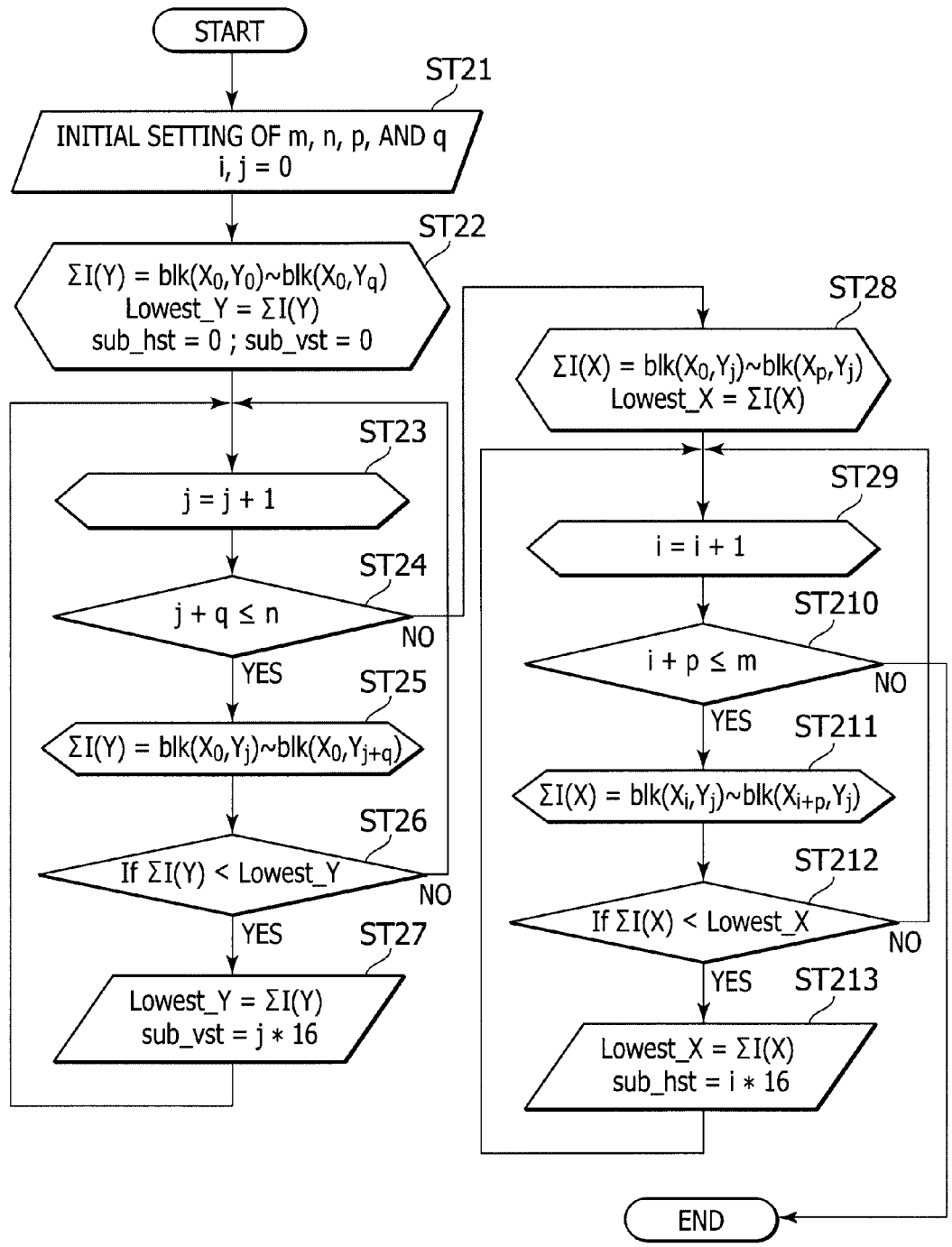
FIG. 11 is a flowchart of a picture processing device in which a picture processing method according to the embodiment is adopted.

FIG. 11 is a flowchart of a picture processing device in which a picture processing method according to the embodiment is adopted.

In the first embodiment, as shown from the step ST11 to the step ST 113 shown in FIG. 10, the detection unit 17 fixes the starting position of scanning in the X-axis direction of the base picture region 201 to the position sub_hst, and thereafter, calculates sub_vst, which is the starting position of scanning in the Y-axis direction.

However, in the embodiment, the detection unit 17 firstly fixes the starting position of scanning in the Y-axis direction of the base picture image region 201 to the position sub_vst, and thereafter, calculates sub_hst which is the starting position of scanning in the X-axis direction.

That is, as shown in FIG. 11, step ST22 to step ST27 according to the embodiment correspond to the step ST18 to the step ST113 according to the first embodiment. Step ST28 to step ST213 according to the embodiment correspond to the step ST12 to the step ST17 according to the first embodiment.

In the present embodiment also, an effect similar to that in the first embodiment may be obtained.

The detection unit 17 sorts each of the values of the total sum ΣI(X) of the X-axis direction and the total sum ΣI(Y) of the Y-axis direction calculated at steps from the step ST11 to the step ST13 (see FIG. 10) in the first embodiment in order from a lowest value to a highest value, for example. Subsequently, the detection unit 17 may calculate all combinations of the sorted total sum ΣI(X) and total sum ΣI(Y) to obtain the region in which the variation of the motion vector value is small.

Further, the detection unit 17 may use the steps from ST21 to ST213 (see FIG. 11) according to the second embodiment to obtain the total sum ΣI(X) and the total sum ΣI(Y), for example.

The first and second embodiments according to the present invention is just an example, and a configuration of the picture processing device 10 is not particularly limited.

The methods described above in detail may be configured as a program following the procedures to be executed by a computer such as a CPU.

Further, such a program may be executed by being stored in a recording medium, such as a semiconductor memory, a magnetic disk, an optical disk, a floppy (registered trademark) disk, etc., and accessed by a computer which is set up with this recording medium.

It should be understood by those skilled in the art that various modifications, combinations, sub-combinations and alterations may occur depending on design requirements and other factors insofar as they are within the scope of the appended claims or the equivalents thereof.

The present document contains subject matter related to Japanese Patent Application No. 2007-167374 filed in the Japanese Patent Office on Mar. 12, 2008, the entire content of which being incorporated herein by reference.

What is claimed is:

1. A picture processing device for performing a process of superposing a sub picture image on a moving picture image which forms a base, comprising:

a detection unit configured to detect, based on the sub picture image, a region of the moving picture image in which a movement amount is small, out of a plurality of regions in which the sub picture image may be superposed on the moving picture image;

a picture image superposing unit configured to superpose, via a processor, the sub picture image on the region in which the movement amount is small;

a main processor configured to process the moving picture image; and a sub processor configured to process the sub picture image wherein in the moving picture image, a plurality of picture images are divided into a plurality of blocks such that each picture image includes a predetermined number of pixels, and subjected to a predetermined compression process, the detection unit obtains motion vector information from a block of each picture image included in the moving picture image and calculates a region in which a variation of the movement amount between picture images in the moving picture image is small, the detection unit calculates a total sum of movement amounts per predetermined number of block units and successively compares the total sum between the adjacent blocks while sequentially scanning the blocks in a predetermined direction to calculate a region in which the total sum becomes small, and the image superposing unit superposes the sub picture image obtained from the sub processor on the region of the moving picture image obtained from the main processor.

2. The picture processing device according to claim 1, comprising:

a display unit configured to display the moving picture image outputted from the image superposing unit.

3. The picture processing device according to claim 1, wherein the detection unit detects the region of the moving picture image in which a movement amount is small based on the size of the sub picture image.

4. A picture processing method for performing a process of superposing a sub picture image on a moving picture image which forms a base, comprising:

detecting, based on the sub picture image, a region of the moving picture image in which a movement amount is small, out of a plurality of regions in which the sub picture image may be superposed on the moving picture image;

superposing, via a processor, the sub picture image on the region where the movement amount is small;

processing, via a main processor, the moving picture image; and processing, via a sub processor, the sub picture image, wherein in the moving picture image a plurality of picture images are divided into a plurality of blocks such that each picture image includes a predetermined number of pixels, and subjected to a predetermined compression process, the detecting obtains motion vector information from a block of each picture image included in the moving picture image and calculates a region in which a variation of the movement amount between picture images in the moving picture image is small, the detecting calculates a total sum of movement amounts per predetermined number of block units and successively compares the total sum between the adjacent blocks while sequentially scanning the blocks in a predetermined direction to calculate a region in which the total sum becomes small, and the superposing superposes the sub picture image obtained from the sub processor on the region of the moving picture image obtained from the main processor.

5. A non-transitory computer-readable medium storing computer readable instructions thereon that when executed by a picture processing device cause the picture processing device to perform a method for performing a process of superposing a sub picture image on a moving picture image which forms a base, the method comprising:

detecting, based on the sub picture image, a region of the moving picture image in which a movement amount is small, out of a plurality of regions in which the sub picture image may be superposed on the moving picture image; and superposing the sub picture image on the region in which the movement amount is small;

processing, via a main processor, the moving picture image: and processing, via a sub processor, the sub picture image, wherein in the moving picture image, a plurality of picture images are divided into a plurality of blocks such that each picture image includes a predetermined number of pixels and subjected to a predetermined compression process, the detecting obtains motion vector information from a block of each picture image included in the moving picture image and calculates a region in which a variation of the movement amount between picture images in the moving picture image is small, the detecting calculates lit total sum of movement amounts per predetermined number of block units and successively compares the total sum between the adjacent blocks while sequentially scanning the blocks in a predetermined direction to calculate a region in which the total sum becomes small, and the superposing superposes the sub picture image obtained from the sub processor on the region of the moving picture image obtained from the main processor.

\* \* \* \* \*